United States Patent [19]

Holtmyer et al.

[11] Patent Number: 4,982,793
[45] Date of Patent: Jan. 8, 1991

[54] CROSSLINKABLE CELLULOSE DERIVATIVES

[75] Inventors: Marlin D. Holtmyer; Charles V. Hunt; Weldon M. Harms, all of Duncan, Okla.

[73] Assignee: Halliburton Company, Duncan, Okla.

[21] Appl. No.: 322,155

[22] Filed: Mar. 10, 1989

[51] Int. Cl.$^5$ .................. E21B 43/04; E21B 43/25; E21B 43/26
[52] U.S. Cl. .................. 166/305.1; 166/278; 166/308; 252/8.551
[58] Field of Search .............. 252/8.551; 166/270, 166/271, 276, 278, 280, 294, 295, 300, 308, 305.1; 523/130, 131

[56] References Cited

U.S. PATENT DOCUMENTS

| | | | |
|---|---|---|---|
| 2,922,768 | 1/1960 | Mino et al. | 527/310 |
| 3,341,483 | 9/1967 | Zilkha et al. | 527/310 |
| 3,359,224 | 12/1967 | Faessinger . | |
| 3,488,210 | 1/1970 | Kuzmak et al. . | |
| 3,607,799 | 9/1971 | Barbehenn et al. . | |
| 3,682,632 | 8/1972 | Arai et al. . | |
| 3,888,312 | 6/1975 | Tiner et al. | 166/308 |
| 3,943,996 | 3/1976 | Guilbault et al. | 166/293 |
| 3,977,954 | 8/1976 | Needles et al. . | |
| 4,131,576 | 12/1978 | Iovine et al. . | |
| 4,135,943 | 1/1979 | Morishita et al. | 106/209 |
| 4,174,309 | 11/1979 | Stournas | 166/274 |
| 4,324,668 | 4/1982 | Harris | 252/8.551 |
| 4,352,902 | 10/1982 | Nakayama et al. | 524/40 |
| 4,415,703 | 11/1983 | Toba et al. | 525/54.21 |
| 4,435,531 | 3/1984 | Nakayama et al. | 524/37 |
| 4,521,565 | 6/1985 | Toaba et al. | 525/64 |
| 4,523,010 | 6/1985 | Lukach et al. | 252/8.551 |
| 4,540,742 | 9/1985 | Okamato | 525/61 |
| 4,549,907 | 10/1985 | Kohn | 252/8.551 |
| 4,552,215 | 11/1985 | Almond et al. | 166/278 |
| 4,555,468 | 11/1985 | Yano et al. | 430/160 |
| 4,566,976 | 1/1986 | House et al. | 252/8.551 |
| 4,690,996 | 9/1987 | Shih | 527/312 |
| 4,866,151 | 9/1989 | Tsai et al. | 527/313 X |

FOREIGN PATENT DOCUMENTS

| | | | |
|---|---|---|---|
| 1162342 | 2/1964 | Fed. Rep. of Germany | 527/312 |
| 2051698 | 2/1973 | Fed. Rep. of Germany | 527/312 |
| 53130789 | 11/1978 | Japan | 527/312 |
| 61-097312A | 5/1986 | Japan | 27/314 |
| 0159657 | 1/1964 | U.S.S.R. | 527/312 |
| 1088672 | 10/1967 | United Kingdom | 527/310 |

Primary Examiner—George A. Suchfield
Attorney, Agent, or Firm—Robert A. Kent

[57] ABSTRACT

Novel treating fluid compositions containing crosslinkable non-ionic cellulose derivatives and methods of use in petroleum recovery operations are disclosed. The treating fluid polymers are prepared by reacting vinyl or allyl monomers having a crosslinkable substitutent with a cellulose derivative using a ceric ion redox system. Treatment of a non-ionic cellulose derivative with a ceric ion redox system also yields a crosslinkable polymer. The polymers readily crosslink with polyvalent metal ions, such as zirconium and titanium, to form temperature-stable gels useful in petroleum recovery operations.

26 Claims, No Drawings

CROSSLINKABLE CELLULOSE DERIVATIVES

BACKGROUND OF THE INVENTION

This invention relates to copolymers of cellulose ether derivatives that are soluble in aqueous liquids and capable of crosslinking with polyvalent metal cations to form viscoelastic gels which are useful in petroleum recovery operations.

Petroleum recovery operations, such as well stimulation and gravel packing, often require the use of fluid compositions capable of suspending particles. In gravel packing operations, a pack of gravel is placed on the exterior of a perforated or slotted liner or screen which is positioned across an unconsolidated formation. The resulting structure presents a barrier to migrating sand from the formation while still permitting fluid flow. The gravel is carried to the formation in the form of a slurry by mixing gravel with a viscosified fluid. Once the gravel is placed in the wellbore, the viscosified carrier fluid is degraded and returned to the surface.

Treating fluids are used similarly in stimulating subterranean formations. The viscosified fluid carries a propping agent through the wellbore and into both natural fractures and fractures in the formation caused by hydraulic pressure. Once the desired fracture occurs, the fluid is degraded and returned to the surface leaving the proppant in the formation to provide a conductive channel through which formation fluids can flow. In both stimulation and gravel packing operations, the most desirable treating fluid reduces friction pressure as the fluid is pumped through the tubular goods and transports the propping agent or gravel to the formation without particle settling in the wellbore during placement.

Treating fluids with these properties are generally comprised of a hydratable polysaccharide, including but not limited to guar, guar derivatives, and cellulose derivatives. These polymers viscosify aqueous liquids to form solutions which inhibit particle settling to a limited extent by virtue of viscosity. However, these polymer solutions can approach near zero particle settling rates upon crosslinking with multivalent metal cations to form highly viscoelastic gels. The utility of these gels is well known in the art of petroleum recovery operations.

Cellulose derivatives are the preferred viscosifying polymers for certain petroleum recovery operations because they degrade, i.e., lose viscosity without generating water insoluble particles or residue. The water insoluble particles are believed to remain in the formation and may cause formation plugging or impair the permeability of sand or gravel packs. However, cellulose derivatives have had limited use in many petroleum applications because most derivatives are salt sensitive or not crosslinkable. Non-ionic derivatives of cellulose are generally not crosslinkable because the polymer lacks a site for attachment of a multivalent metal cation. Examples of this type include hydroxyalkyl cellulose ethers, methyl cellulose, ethyl cellulose, and hydroxyalkyl methyl cellulose. A crosslinkable non-ionic cellulose derivative has been prepared and described in U.S. Pat. Nos. 4,523,010 and 4,552,215 which are herein incorporated by reference. In these disclosures, dihydroxypropyl hydroxyalkyl cellulose is prepared by a condensation reaction of glycidol with hydroxyethyl cellulose under alkaline conditions. The glycidol addition along the HEC polymer chain provides a site of attachment for multivalent metal cations.

Anionic cellulose derivatives are normally substituted with carboxyl groups along the polymer chain. The carboxyl groups complex with polyvalent metal cations, such as aluminum. Gels formed with this chemistry tend to have limited structural stability at formation temperatures of about 250° F. In addition, carboxylate substituents render the polymer salt sensitive, i.e., the viscosity of the polymer in a salt solution is less than the viscosity in water. Salt sensitivity is not a desirable property because the aqueous liquids used in recovery operations must generally contain chloride salts to inhibit the swelling of formation clays.

The present invention provides new and useful crosslinkable graft copolymers of cellulose derivatives, which are generally non-ionic in character. Methods of grafting monomers on polyhydroxy containing compounds are well known in the art. The process is described in U.S. Pat. No. 2,922,768, herein corporated by reference, in which a vinylidene monomer is polymerized with an organic reducing agent, such as cellulose, in the presence of a ceric salt in aqueous medium under acidic conditions. In accordance with the present invention, crosslinkable cellulose derivatives are prepared by grafting vinyl or allyl monomers having a crosslinkable substituent onto the cellulose derivative. The resulting copolymer is non-ionic and crosslinks readily with polyvalent metal cations to form stable viscoelastic gels, thus overcoming the deficiencies of non-ionic and anionic cellulose derivatives currently used in petroleum recovery operations.

SUMMARY OF THE INVENTION

The surprising discovery has been made that certain graft copolymers of hydroxyethyl cellulose can be crosslinked with multivalent metal cations. The crosslinkable copolymers are formed by the free radical addition of vinyl or allyl monomers having a crosslinkable substituent to cellulose derivatives using a redox system of ceric ions in acidic medium. A more surprising discovery has been made that acidic ceric ion treatment of a non-ionic cellulose derivative alone yields a crosslinkable polymer. These compounds are particularly useful in petroleum recovery operations in which crosslinkable cellulose derivatives are used to provide highly viscoelastic gels that degrade without generating significant quantities of water insoluble residue.

DETAILED DESCRIPTION

The present invention provides a composition and method for treating subterranean formations. The treating fluid composition of the present invention comprises an aqueous liquid, a novel crosslinkable copolymer of HEC and a selected crosslinking agent. The fluid composition can be used in petroleum recovery operations, such as stimulation, gravel packing and other well completion operations. In these operations, the treating fluid performs a variety of functions, for example, (1) reducing friction pressure as the fluid is pumped through tubular goods and down the wellbore and (2) to carry propping agents or gravel packing materials to the formation without settling. A highly viscoelastic fluid is often times required to transport propping agents or gravel packing materials to the formation without settling. In addition, the treating fluid must have stable viscosity at formation temperatures. The present invention provides such a fluid.

An aqueous liquid is used to solubilize the novel copolymer of the present invention. The term "aqueous liquid" is used hereafter to mean any liquid containing sufficient water to at least partially hydrate the copolymer and result in an increase in the viscosity of the fluid. Aqueous liquids used in petroleum recovery operations normally contain sodium chloride, potassium chloride, or other salts to inhibit the swelling of clays generally found in subterranean formations. The pH of the aqueous liquid must be compatible with the selected crosslinking agent and must not adversely affect the hydration of the copolymer.

The crosslinkable copolymers of this invention are prepared by reacting certain allyl or vinyl monomers having a crosslinkable substituent, such as vicinal dihydroxy groups or a vinyl phosphonic acid, with a cellulose derivative using a redox system comprising ceric ions and nitric acid. The generalized reaction is believed to be represented by the formula:

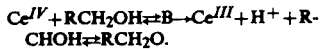

$$Ce^{IV} + RCH_2OH \rightleftarrows B \rightarrow Ce^{III} + H^+ + R\text{-}CHOH \rightleftarrows RCH_2O.$$

where B is the ceric-alcohol complex, R is the cellulose derivative, and RCHOH is a free radical. Graft copolymerizations of cellulose commonly use chemical initiators, such as ceric ions. In acid media, ceric ions oxidize 1,2-glycols with the formation of a free radical on a reducing agent, which is the cellulose derivative in this case. The free radical produced on the cellulose derivative initiates polymerization with the vinyl group of the monomer to produce the graft copolymer.

The cellulose derivative of this invention is preferably a hydroxyalkyl cellulose having a hydroxyalkyl molar substitution from about 1.5 to about 3.0. Molar substitution is defined as the average number of moles of a substituent group present per anhydrogluclose unit of the cellulose material. The preferred hydroxyalkyl cellulose is hydroxyethyl cellulose (HEC) having a molar substitution in the range of about 1.8 to about 2.5. Preferably in this invention, the hydroxyalkyl cellulose is preformed in a separate reaction. Hydroxyethyl cellulose is usually formed by reacting ethylene oxide with cellulose under extreme alkaline conditions and is available commercially.

The copolymers of the present invention are rendered crosslinkable by grafting certain allyl or vinyl monomers having vicinal dihydroxy groups or a vinyl phosponic acid to the cellulose derivative. The monomers have the reactive $CH_2=C-$ moiety that enables the monomer to attach to a hydroxyl group of the cellulose derivative. The monomer of the present invention must also provide a crosslinkable substituent, such as a vicinal dihydroxy group or a phosphonate group, which enables the copolymer to crosslink upon solvation. The preferred grafting monomers for practicing this invention include, but are not limited to, glyceryl allyl ether (GAE), 2,3-dihydroxypropylmethacrylate (DHPM), vinyl phosphonic acid (VPA), allyl glycidyl ether (AGE), and glycidyl methacrylate (GMA). For copolymers containing AGE and GMA, the epoxide group must be hydroylzed to render the polymer crosslinkable. The most preferred grafting monomers are GMA and VPA.

Typically, graft copolymerizations are carried out in aqueous media wherein the polymer is dissolved or dispersed. Copolymers of this invention were prepared in acetone (55% to 90%) and water (45% to 10%) or methanol (about 70%) and water (about 30%). Reactions were carried out in a 1 liter kettle with a stirrer or a 1 liter jar at about 20° C. to about 60° C. The ratio of cellulose derivative to aqueous medium ranges from about 1 g per 100 ml to about 1 g per 4 ml. The preferred ratio is from about 1 g/6 ml to 1 g/4 ml. The ratio of cellulose derivative to grafting monomer ranges from about 3 g per 1 ml to about 25 g per 1 ml. The preferred ratio is from about 6 g/1 ml to about 12 g/1 ml.

The polymerization reaction of the present invention is chemically initiated by a redox system comprising ceric ions in acidic medium. Ceric ions may be provided, for example, by salts such as ceric nitrate, ceric sulfate, ceric ammonium nitrate, and ceric ammonium sulfate. The preferred ceric initiator of the present invention is a solution of ceric ammonium nitrate in 1N nitric acid. Ceric ammonium nitrate is present in an amount of from about 0.00075 mole/100 ml to about 0.005 mole/100 ml reaction medium.

The ceric initiator may be added slowly to the reaction material over a time period of about 30 to 90 seconds or longer. Reaction times vary from about 10 minutes to 20 hours depending on reaction conditions or the particular grafting monomer. Grafting reaction efficiency is generally less than about 50%. Typical conditions for the various grafting monomers are shown in the examples. After the reaction is complete, the polymerization product is washed with acetone, filtered, and dried.

In preparing the copolymers of this invention, the discovery was made that treatment of hydroxyalkyl cellulose with only ceric ammonium nitrate (CAN)/nitric acid solution also rendered the polymer crosslinkable. Tests were conducted in which the grafting monomer was omitted from the reaction and the resulting product was to serve as a control sample. Surprisingly, the ceric ammonium nitrate/nitric acid treatment produced a hydroxyalkyl cellulose capable of crosslinking with a titanium crosslinking agent.

An alternative method of preparing CAN-treated cellulose derivatives was found in which diesel was used as the reaction medium. Hydroxyethyl cellulose was added to the diesel to form a slurry of about 37% solids. CAN/nitric acid solution was added to the slurry and allowed to set for a minimum of ¼ up to 16 hours. Polymers prepared by this method performed as well as polymers treated under nitrogen atmosphere.

Graft copolymers of the present invention readily solubilize in aqueous liquids and substantially increase the viscosity of aqueous liquids. The viscosity of the copolymer solution may be further increased with the addition of a selected crosslinking agent. Preferred crosslinking agents in accordance with this invention comprise polyvalent metal cations such as aluminum, titanium, zirconium, chromium, antimony, and the like. Most preferred crosslinking agents provide titanium (IV) or zirconium (IV) ions in the range of about 0.005 weight percent to about 0.05 weight percent in the aqueous liquid. Examples of such crosslinking agents include triethanolamine titanate, titanium acetylacetonate, zirconium acetate, zirconium lactate and other organic complexes of titanium and zirconium capable of providing Ti (IV) and Zr (IV) ions.

The preferred use of the present invention is to blend the graft copolymer of HEC or CAN-treated HEC with other cellulose derivatives such as HEC or CMHEC. Blending about 20% of the polymers of the present invention in place of the HEC or CMHEC provides a cost-effective means for obtaining substantially increased gel stability. The viscosity stability of the polymer blends exceeds the stability of CMHEC alone when crosslinked with zirconium and evaluated at 250° F.

The following examples are provided to illustrate the utility of the novel treating fluid composition of the present invention, and the invention is not to be limited by these examples.

EXAMPLE 1

To a 1 liter kettle equipped with a stirrer, the following reagents were added: 6 g HEC containing 6% $H_2O$ (MS of about 2.2), 165 ml acetone, 115 ml deionized water and 1 ml GMA (98% active from Aldrich Chemicals). The kettle was purged with nitrogen for 30 minutes while stirring at 300 RPM. Ceric ammonium nitrate (CAN) solution was prepared in an addition funnel in which 0.49 g CAN was admixed with 9 ml 1N $HNO_3$ and 10 ml deionized water. The addition funnel contents were also purged with nitrogen for 30 minutes. After raising the stirring rate of the kettle stirrer to 1,000 RPM, the contents of the addition funnel are added slowly over a period of 5 minutes.

Once the CAN solution was added, the stirring rate was reduced to 300 RPM, and the reaction proceeded at 40° C. After about 20 hours, the stirring rate was again increased to 1,000 RPM and acetone was added to precipitate the reaction product. The reaction product was washed with acetone and filtered 3 times, then dried in a vacuum oven until a constant weight was obtained.

The reaction product at 0.72% by weight was hydrated in 2% potassium chloride (KCl) solution. The viscosity of the polymer solution measured 84 centipoises (cps) at 511 $s^{-1}$ using a Fann Model 35 ® viscometer. The HEC/GMA polymer solution was admixed with a diluted triethanolamine titanate crosslinker at a concentration of 5 gallons per 1000 gallons of aqueous liquid (gpt) and a highly viscoelastic gel formed at room temperature within 10 minutes. A very rigid gel formed within 30 minutes. The HEC/GMA copolymer also formed a gel upon addition of 2.5 gpt of zirconium lactate crosslinking agent after 60 minutes at 180° F.

EXAMPLE 2

To a 1 liter jar, the following reagents were added: 48 g HEC (about 2.2 MS), 270 ml acetone, 13 ml deionized water, 8 ml VPA (65% active). The jar contents were mixed using a magnetic stirrer at moderate speeds while purging with nitrogen for 30 minutes. To an addition funnel, 0.245 g CAN was admixed with 4.5 ml 1N nitric acid and 4.5 ml deionized water and purged with nitrogen for 30 minutes. The CAN solution was slowly added to the 1 liter jar. The reaction proceeded at room temperature for 3 hours with continued nitrogen purging and mixing. The reaction product was washed in 500 ml acetone for 5 minutes, filtered and dried under vacuum until a constant weight was obtained.

The VPA/HEC copolymer at 0.72 weight % was solubilized in 2% KCL and the viscosity measured 93 cps at 511 $s^{-1}$. Crosslink performance tests were conducted using triethanolamine titanate, zirconium acetylacetonate and zirconium lactate. Rigid gels formed at room temperature with a triethanolamine titanate crosslinker (5 gpt) and a zirconium acetate crosslinker (2.5 gpt). A fluid gel formed with a zirconium lactate crosslinker (3.0 gpt) at 180° F.

EXAMPLE 3

A control sample was prepared by adding 50 g HEC to 180 ml acetone in a 1 liter kettle equipped with a stirrer. The kettle contents were purged with nitrogen for 30 minutes. To an addition funnel, 2.65 g CAN, 6.0 ml 1N nitric acid and 14 ml deionized water were added and purged with nitrogen for 30 minutes. The ceric ammonium nitrate solution was added slowly to the kettle over one minute. The reaction proceeded for 90 minutes under nitrogen purge. Acetone was added to the kettle after 90 minutes to precipitate the reaction product. The precipitate was filtered and dried.

The dried product at a concentration of 0.72 weight percent was hydrated in 2% potassium chloride solution and the solution measured 94 cps at 511 $s^{-1}$. A gel formed within 15 minutes when the polymer solution was admixed with a triethanolamine titanate crosslinker.

EXAMPLE 4

To demonstrate the enhanced viscosity stability provided by these graft copolymers, the following tests were performed. Carboxymethyl hydroxyethyl cellulose (CMHEC) at 0.48% wt was solvated in 2% potassium chloride, which also contained 0.12% wt ammonium acetate buffer to provide a pH of about 5 to the fluid, 0.04% wt urea, and 0.12% wt sodium thiosulfate. Graft copolymers of the present invention were added to the CMHEC solution at 0.12% by weight. For a control sample, an additional 0.12% of CMHEC was added. The polymer solutions were admixed with a zirconium (IV) crosslinking agent and evaluated on a FANN Model 50 ® viscometer at 250° F. The results in the table below show a substantial increase in the viscosity stability of the gel with the addition of the graft copolymers.

| Grafting Monomer | Monomer to HEC Ratio | Apparent Viscosity (cps) at 170 $s^{-1}$ after 120 minutes @ 250° F. |
|---|---|---|
| GMA | 1:24 | 175 |
| GMA | 1:6 | 140 |
| GAE | 1:6 | >50 |
| Control | — | <50[1] |

[1] After 40 minutes

EXAMPLE 5

To further demonstrate the enhanced viscosity stability provided by the graft copolymers of the present invention, the following tests were performed. Solutions of CMHEC and additives were prepared as described in Example 4. Graft copolymers as described in the table below and CAN-treated HEC of the present invention were prepared and added to the CMHEC solution at 0.12% by weight. The polymer solutions were then admixed with a zirconium (IV) crosslinking agent and evaluated on a FANN Model 50 ® viscometer at 250° F. Viscosity stability of the gels made from polymer blends was remarkably consistent. Generally, initial viscosities ranged from about 150 to about 200 cps at 170 $s^{-1}$. The viscosity development peaked in the range of 200 to 350 cps at 170 $s^{-1}$ after about 25 minutes to 40 minutes elapsed time. After 120 minutes, the viscosity of the gels ranged from about 100 to 200 cps at 170 $s^{-1}$. Polymers that were CAN-treated under ambient conditions (Nos. 25 and 26) performed equally to polymers prepared under nitrogen atmosphere in these test conditions. Graft copolymers prepared with vinyl phosphonic acid (Nos. 15 and 16) produced only slightly higher viscosity than the control sample.

TABLE

| 0.48 wt % CMHEC | | Zirconium Crosslinker | |
|---|---|---|---|
| 0.12 wt % CAN-treated polymer | | 2% KCl | |
| 0.16 wt % stabilizer | | 0.12 wt % Buffer | |

| Polymer No. | Monomer | HEC/Monomer Ratio | Initial[1] | Viscosity (cps) at 170 s$^{-1}$ After 120 Minutes at 250° F. |
|---|---|---|---|---|
| 1 | — | — | 148 | 108 |
| 2 | — | — | 163 | 131 |
| 3 | — | — | 158 | 108 |
| 4 | — | — | 158 | 154 |
| 5 | — | — | 159 | 104 |
| 6 | — | — | 181 | 185 |
| 7 | — | — | 173 | 129 |
| 8 | — | — | 182 | 105 |
| 9 | AGE | 50/2 | 180 | 143 |
| 10 | AGE | 50/10 | 167 | 126 |
| 11 | GAE | 50/2 | 173 | 132 |
| 12 | GAE | 50/10 | 179 | 149 |
| 13 | GMA | 50/2 | 143 | 97 |
| 14 | GMA | 50/10 | 181 | 123 |
| 15 | VPA | 50/2 | 107 | 40 |
| 16 | VPA | 50/10 | 69 | — |
| 17 | DHPM | 50/2 | 177 | 102 |
| 18 | DHPM | 50/10 | 147 | 141 |
| 19 | — | — | 161 | 153 |
| 20 | — | — | 216 | 149 |
| 21 | — | — | 202 | 173 |
| 22 | GAE | 50/2 | 194 | 182 |
| 23 | GAE | 50/2 | 189 | 116 |
| 24 | GAE | 50/4 | 216 | 163 |
| 25[2] | — | — | 137 | 94 |
| 26[2] | — | — | 127 | 118 |
| CONTROL | — | — | 175 | <50[3] |

[1]Ambient Temperature
[2]CAN-Treated/Ambient Conditions
[3]After 40 Minutes

What is claimed is:

1. A method for treating a subterranean formation comprising:
   preparing a treating fluid composition with or without a particulate agent by admixing an aqueous liquid, a cellulose ether derivative consisting essentially of the reaction product of a cellulose ether with a ceric salt, said reaction occurring under acidic conditions and at a temperature in the range of from about 20° to about 60° C. and a crosslinking agent; and
   injecting said treating fluid composition into said subterranean formation through a wellbore.

2. The method of claim 1 wherein said cellulose ether derivative is selected from the group comprising hydroxyalkyl cellulose, carboxymethyl cellulose, and carboxymethyl hydroxyalkyl cellulose.

3. The method of claim 1 wherein said ceric salt is selected from the group comprising ceric nitrate, ceric sulfate, ceric ammonium nitrate, and ceric ammonium sulfate.

4. The method of claim 3 wherein said crosslinking agent is selected from the group comprising polyvalent metal cations providing titanium (IV) ions or zirconium (IV) ions.

5. A method of treating a subterranean formation comprising:
   preparing a treating fluid composition with or without a particulate agent by admixing an aqueous liquid, a cellulose ether derivative that is chemically modified by reacting under acidic conditions said cellulose ether derivative with a vinyl phosphonic acid and a ceric salt, and a crosslinking agent; and
   injecting said treating fluid composition into said subterranean formation through a wellbore.

6. The method of claim 5 wherein said cellulose ether derivative is selected from the group comprising hydroxyalkyl cellulose, carboxymethyl cellulose, and carboxymethyl hydroxylalkyl cellulose.

7. The method of claim 5 wherein said ceric salt is selected from the group comprising ceric nitrate, ceric sulfate, ceric ammonium nitrate, and ceric ammonium sulfate.

8. The method of claim 5 wherein said crosslinking agent is selected from the group comprising polyvalent metal cations providing titanium (IV) or zirconium (IV) ions.

9. A method of treating a subterranean formation comprising:
   preparing a treating fluid composition with or without a particulate agent by admixing an aqueous liquid, a hydroxyethyl cellulose derivative consisting essentially of the reaction product of hydroxyethyl cellulose with a ceric salt, said reaction occurring under acidic conditions and at a temperature in the range of from about 20° to about 60° C., and a crosslinking agent; and
   injecting said treating fluid composition into said subterranean formation through a wellbore.

10. The method of claim 9 wherein said crosslinking agent is selected from the group comprising polyvalent metal cations providing titanium (IV) ions or zirconium (IV) ions.

11. The method of claim 9 wherein said ceric salt is selected from the group comprising ceric nitrate, ceric sulfate, ceric ammonium nitrate, and ceric ammonium sulfate.

12. A method of treating a subterranean formation comprising:
   preparing a treating fluid composition with or without a particulate agent by admixing an aqueous liquid, hydroxyethyl cellulose which is chemically modified by reacting under acidic conditions said hydroxyethyl cellulose with vinyl phosphonic acid and a ceric salt, and a crosslinking agent; and
   injecting said treating fluid composition into said subterranean formation through a wellbore.

13. The method of claim 12 wherein said ceric salt is selected from the group comprising ceric nitrate, ceric sulfate, ceric ammonium nitrate, and ceric ammonium sulfate.

14. The method of claim 12 wherein said crosslinking agent is selected from the group comprising polyvalent metal cations providing titanium (IV) ions or zirconium (IV) ions.

15. A method for treating a subterranean formation comprising:
   preparing or treating fluid composition with or without a particulate agent by admixing an aqueous liquid, a first cellulose ether derivative, a second cellulose ether derivative consisting essentially of the reaction product of a cellulose ether with a ceric salt, said reaction occurring under acidic conditions and at a temperature in the range of from about 20° to about 60° C., and a crosslinking agent; and
   injecting said treating fluid composition into said subterranean formation through a wellbore.

16. The method of claim 15 wherein said first cellulose ether derivative is carboxymethyl hydroxyethyl cellulose.

17. The method of claim 15 wherein said second cellulose ether derivative is selected from the group comprising hydroxyalkyl cellulose, carboxymethyl cellulose, and carboxymethyl hydroxyalkyl cellulose.

18. The method of claim 15 wherein said crosslinking agent is selected from the group comprising polyvalent metal cations providing titanium (IV) ions or zirconium (IV) ions.

19. The method of claim 15 wherein said ceric salt is selected from the group comprising ceric nitrate, ceric sulfate, ceric ammonium nitrate, and ceric ammonium sulfate.

20. A method for treating a subterranean formation comprising:
   preparing a treating fluid composition with or without a particulate agent by admixing an aqueous liquid, a first cellulose ether derivative, a second cellulose ether derivative that is chemically modified by reacting under acidic conditions said second cellulose ether derivative with vinyl phosphonic acid and a ceric salt, and a crosslinking agent; and
   injecting said treating fluid composition into said subterranean formation through a wellbore.

21. The method of claim 20 wherein said first cellulose ether derivative is carboxymethyl hydroxyethyl cellulose.

22. The method of claim 20 wherein said second cellulose ether derivative is hydroxyethyl cellulose.

23. The method of claim 20 wherein said ceric salt is selected from the group comprising ceric nitrate, ceric sulfate, ceric ammonium nitrate, and ceric ammonium sulfate.

24. The method of claim 20 wherein said crosslinking agent is selected from the group comprising polyvalent metal cations providing titanium (IV) ions or zirconium (IV) ions.

25. A method for treating a subterranean formation comprising:
   preparing a treating fluid composition with or without a particulate agent by admixing an aqueous liquid, carboxymethyl hydroxyethyl cellulose, hydroxyethyl cellulose derivative consisting essentially of the reaction product of hydroxyethylcellulose with a ceric salt, said reaction occurring under acidic conditions and at a temperature in the range of from about 20° to about 60° C. and a crosslinking agent selected from the group comprising polyvalent metal cations providing titanium (IV) or zirconium (IV) ions; and
   injecting said treating fluid composition into said subterranean formation through a wellbore.

26. A method for treating a subterranean formation comprising:
   preparing a treating fluid composition with or without a particulate agent by admixing an aqueous liquid, carboxymethyl hydroxyethyl cellulose, hydroxyethyl cellulose that is chemically modified by reacting under acidic conditions said hydroxyethyl cellulose with vinyl phosphonic acid and a ceric salt, and a crosslinking agent selected from the group comprising polyvalent metal cations providing titanium (IV) ions or zirconium (IV) ions; and
   injecting said treating fluid composition into said subterranean formation through a wellbore.

* * * * *